UNITED STATES PATENT OFFICE.

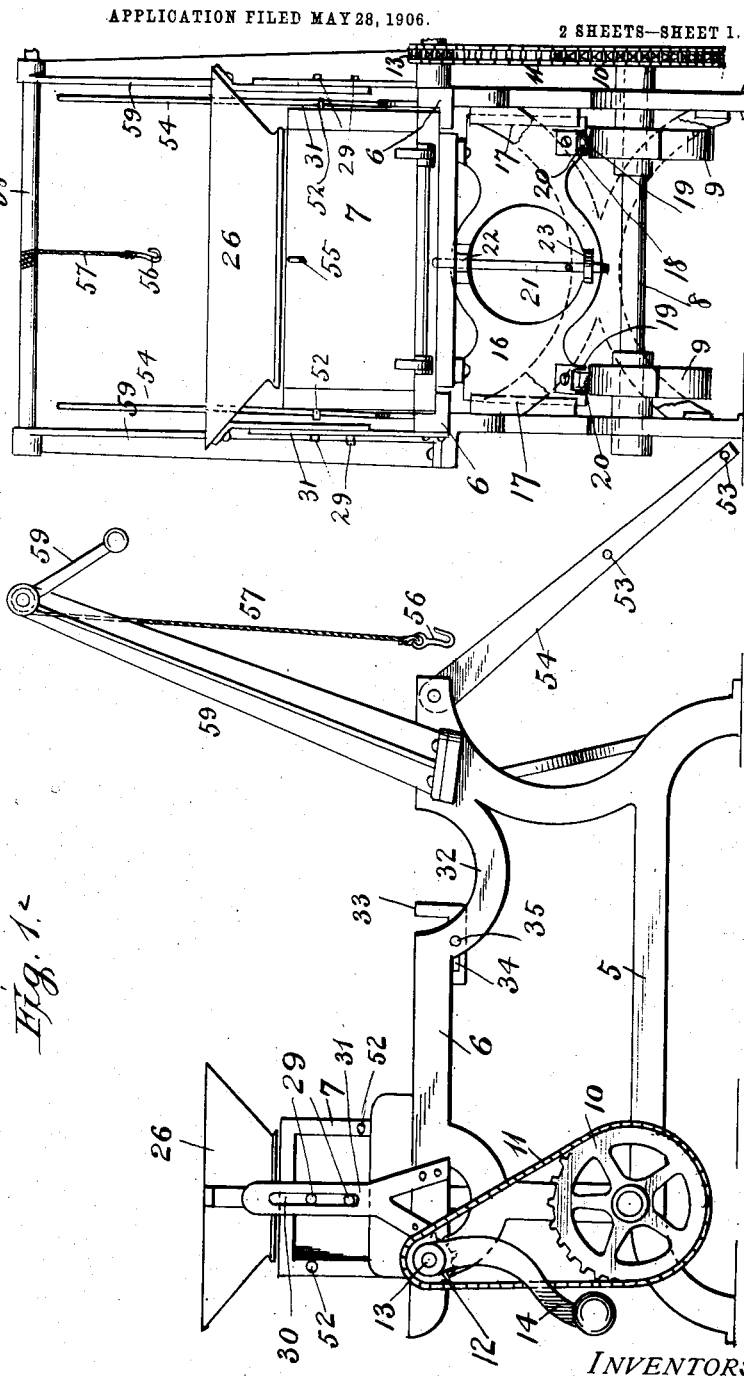

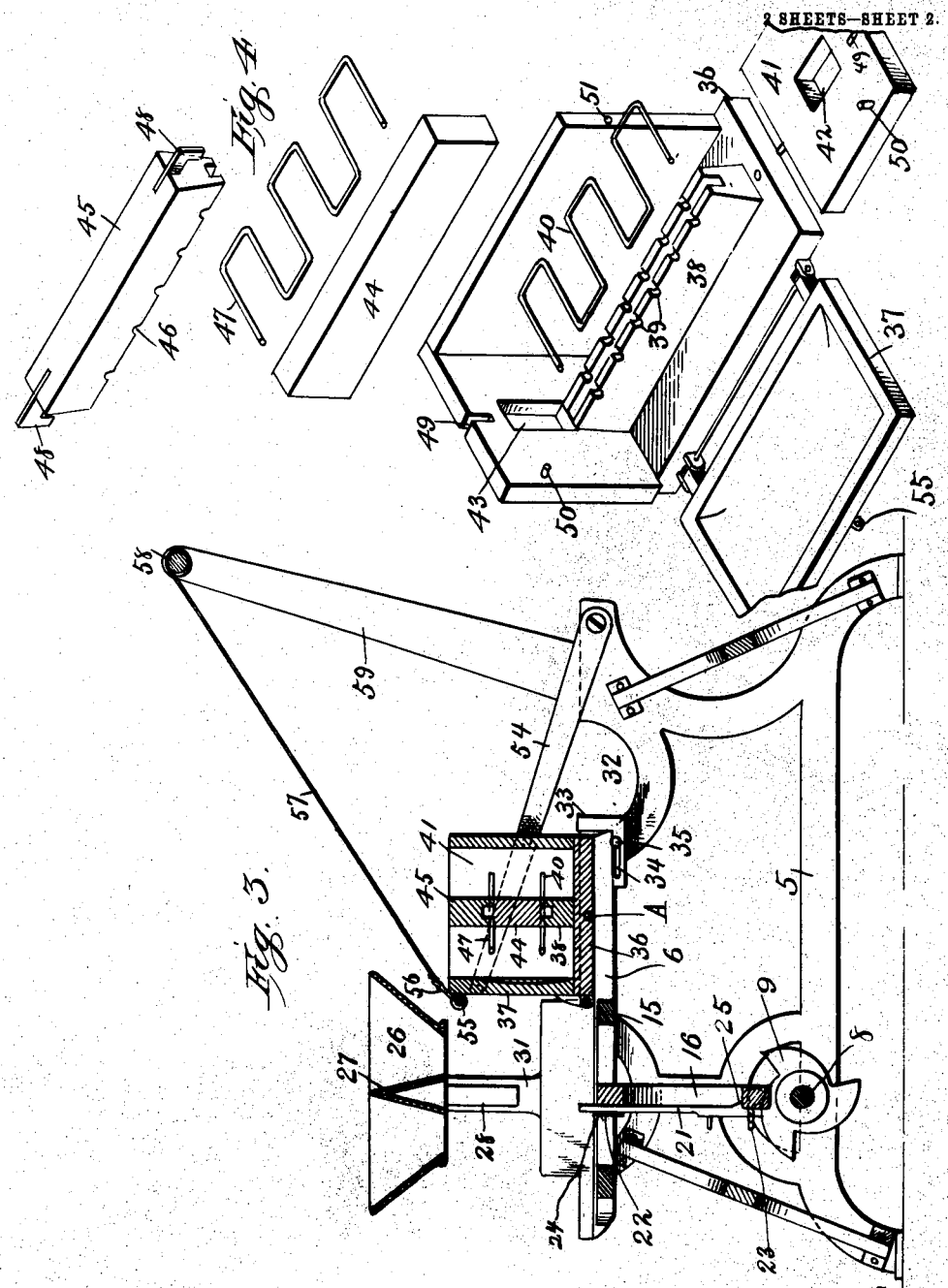

GEORGE ELMER McARTHUR AND CLARENCE P. SPRINGER, OF EATON RAPIDS, MICHIGAN.

BLOCK-MOLDING MACHINE.

No. 834,155.　　　Specification of Letters Patent.　　　Patented Oct. 23, 1906.

Application filed May 28, 1906. Serial No. 319,166.

*To all whom it may concern:*

Be it known that we, GEORGE ELMER McARTHUR and CLARENCE P. SPRINGER, citizens of the United States of America, residing at Eaton Rapids, in the county of Eaton and State of Michigan, have invented certain new and useful Improvements in Block-Molding Machines, of which the following is a specification.

This invention relates to molding-machines, and particularly to that class thereunder designed for use in molding building-blocks.

An object of this invention is to provide novel means for retaining the mold in position on a vibrator, which vibrator acts to pack the material in the mold without the application of force directly to the material. Furthermore, the invention consists in the novel antifriction device interposed between the table of the vibrator and the means for moving it.

A still further object of this invention is to provide a hopper which reciprocates with the movement of the mold, means being provided for limiting the movement of the said hopper, the relation of the hopper to the mold being such that the hopper will smooth the contents of the mold even with the upper edge of said mold and deliver any excess material to the next succeeding mold, which is applied to the vibrator simultaneously with the removal of one just filled.

A still further object of this invention is to provide a machine of the character noted having novel means for elevating the molds and for inverting them during their travel in order that the contents may be discharged to a suitable pallet or receptacle on which they are conveyed and stored until dried or otherwise treated.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view in elevation of a block-molding machine embodying the invention. Fig. 2 is a front elevation thereof. Fig. 3 is a central longitudinal sectional view thereof. Fig. 4 is a perspective view of the mold, parts of which are detached.

In the drawings, 5 indicates the frame of the machine, the side rails 6 of which are L-shaped in cross-section, the flanges forming a track on which the molds, such as 7, can be moved from the front to the rear of the machine. A transverse shaft 8 is mounted in the frame near the front thereof, and said shaft is provided with two camming-wheels 9. The shaft 8 is rotated through the medium of a sprocket-wheel 10, taking motion from a sprocket-chain 11, which is run over a sprocket-wheel 12. The sprocket-wheel 12 is mounted on a stub-shaft 13, projecting from an upper side rail of the frame, and a suitable crank-handle 14 is so connected to the sprocket-wheel 13 as to turn it.

It is to be understood that a power-wheel may be substituted for the crank-handle and that the power-wheel may be driven from any suitable source when the machine is to be changed from a manually-operated to a power-operated apparatus.

Near the front end of the machine is a vibrating table 15, which lies normally slightly below the plane of the track for the molds in order that the molds may freely move into position under the hopper. Formed integral with or otherwise attached to the table is a central standard 16, extending, preferably, beyond the sides of the table and adapted to move vertically in the guides 17, formed on the frame. The lower ends of the standard are provided with plates 18, which extend below the standard and have depending ears 19 in which antifriction-rollers 20 are journaled. The antifriction-rollers are adapted to ride on the cams of the wheels 9, that the standard may take motion from the said cams to raise the table. As soon as the cams release the rollers the table falls by gravity until the rollers are in engagement with the next succeeding cams. Owing to the fact that the table carries the loaded molds, the descent of the table is rather rapid, and when arrested by the engagement of the rollers with the cam-wheels the jarring motion is such as to thoroughly pack the contents of the mold.

As a means for preventing displacement of the molds on the table during its vibration we provide a bolt 21, which is slidable in the guides 22 and 23 on the standard. The standard is provided with a central opening 24, and the wall of said opening, near the bottom of the standard, forms a support for the bolt 21, and said bolt has a shoulder 25, which rests on the standard to hold the said bolt normally projected and in engagement with a mold. The relation of the parts thus described is well illustrated in Figs. 2 and 3. A hole A is made in the bottom of the mold to receive the bolt.

If desired, a spring may be interposed between the guide 23 and the lower end of the bolt to retain the shoulder in engagement with the standard until manipulated to cause a disengagement of these parts, or any suitable means for retaining the shoulder in such position will answer the purposes of the invention.

Suspended over the table is a suitable hopper 26, which is divided centrally by a partition 27 in order to direct the material to the two sides of a mold, to be hereinafter described, and said hopper has a depending arm 28 on each end provided with lugs 29, which ride in the slot 30 of the standard 31. As stated, each end of the hopper is provided with a depending arm and the lugs for guiding the said hopper and for limiting the movement of the hopper and preventing its displacement.

Intermediately their length the side rails are provided with bent sections 32, into which project the buffers 33, designed to arrest the molds as they are pushed rearwardly on the tracks. The buffers have slotted shanks 34, by which they can be adjusted on the bolts 35, which bolts extend through the side rails. The purpose of the buffers is to arrest the molds when at the proper position to be engaged by the hoisting mechanism, which is to be hereinafter described.

Each mold preferably comprises in its construction a suitable base 36, to which a face-plate 37 is hinged. The face-plate has a recessed inner surface which is suitably ornamented in order to ornament the contents of the mold. As it would be impossible to draw the block with the walls of the mold in their proper position, it has been found necessary to hinge the face-plate 37 to the base 36, which may be accomplished in any suitable manner or as shown in the drawings.

As it is the purpose of this invention to manufacture building-blocks with an air-space between the inner and outer walls thereof, the mold is provided with a core adapted to retain tie-rods for connecting the two sections of the block. The base 36 of the mold is provided with a stationary core-section 38, having a series of transversely-disposed seats 39 to receive the tie-rod 40, the said tie-rod extending into the spaces on each side of the core in position to be surrounded by the material applied to the two sides of the mold. The seats 39 are preferably of the depth of the diameter of the material from which the ties are made, or nearly so; but this proportion may be varied to suit particular requirements.

The ends 41 of the mold have central apertures 42 and 43, through which a key 44 is inserted. The key tapers from one end to the other, so that the apertures 42 and 43 taper in size corresponding to the taper of the key. A removable core-section 45 is provided with transversely-disposed seats 46 formed in its lower edge, which are adapted to receive a tie-rod 47, similar in all respects to the tie-rod 40. Hence in assembling the mold the tie-rod 40 is applied to the stationary core-section 38 of the mold and the key 44 is applied through the ends of the mold to retain the tie-rod in place. The second tie-rod 47 is then applied to the upper surface of the key, and the movable section 45 of the core is inserted to confine the tie-rod. In order that the movable section 45 of the core may be held in place, we provide lug projections 48 on the ends, which fit in slots 49 in the ends of the mold.

We prefer that the mold-sections shall be held together by pins or studs 51, entering the sockets 50 in the contacting section, although any suitable means for retaining the parts in assembled relation may be utilized.

When the mold is in the position shown in Fig. 1, under the hopper, the material is applied thereto until the space on each side of the partition or core in the mold is filled. The table is then vibrated to pack the contents of the mold, and after the bolt 21 has been withdrawn from engagement with the mold the said mold is pushed against the buffers, as shown in Fig. 3, where it is in position for the hoisting apparatus to remove it from the machine.

In order to provide for the removal of the mold, the ends thereof are provided with studs 52, which fit in the apertures 53 of the arms 54, which arms are pivoted at the rear of the frame and have free swinging movement longitudinally thereof. It is to be understood that one arm 54 is provided on each side of the machine and that thereby the two ends of the mold are engaged. The face-plate of the mold is provided with a ring 55, to be engaged by a hook 56 on the flexible connection 57, the said flexible connection being wound on a shaft 58, taking motion from a crank-handle 59. When the mold is moved to the position shown in Fig. 3 and the hook 56 is applied to the ring 55, winding of the flexible connection 57 on the shaft will cause the arms 54 to swing on their pivots to carry the mold toward the shaft 58. It will be observed that the shaft 58 is mounted on the inclined standards 59 and that when the flexible connection has been wound until its end reaches the shaft the weight of the mold has passed the vertical plane of the pivots of the arms 54 and the tendency of the said arms will then be to swing rearwardly by gravity. Hence when the parts have been raised to the position indicated unwinding the flexible connection would permit the descent of the mold in an inverted position in order that its contents may be deposited on a pallet or other receptacle provided for its reception.

It is to be understood that the movable section of the core and the key shall be removed before the mold is elevated in order that the contents of said mold may be free to escape when the mold is inverted.

Having fully described our invention, what we claim as new, and desire to secure by Letters Patent, is—

1. In a machine of the character described, a suitable frame, a track supported by the frame, a table between the members of the track, means of oscillating the table, molds slidable on the track above the table, means for causing the table to elevate the molds from the track, and allowing it to descend, and a hopper moved by the molds.

2. In a machine of the character described, a suitable frame, a track supported by the frame, a table between the members of the track, means for oscillating the table, molds slidable on the track above the table, means for causing the table to elevate the molds from the track, and allowing it to descend, a hopper moved by the molds, and means for guiding the hopper.

3. In a machine of the character described, a suitable frame, a track supported by the frame, a table between the members of the track, means for oscillating the table, molds slidable on the track above the table, means for causing the table to elevate the molds from the track, and allowing it to descend, a hopper moved by the molds, standards rising from the frame, arms depending from the hopper, lugs on the arms for riding in the slots of the standard.

4. In a brick-molding machine, a suitable frame, a track thereon, molds slidable on the track and buffers projecting into the path of travel of the molds.

5. In a molding-machine, a suitable frame, a track thereon, molds slidable on the track, buffers for arresting the molds and suitable hoisting mechanism for engaging the molds.

6. In a molding-machine, a suitable frame, a track thereon, molds slidable on the track, lugs on the molds, swinging arms having apertures to receive the lugs, and means for arresting the molds when the lugs are in alinement with the said apertures.

7. In a molding-machine, a suitable frame, a track thereon, molds slidable on the track, lugs on the molds, swinging arms having apertures to receive the lugs, and means for arresting the molds when the lugs are in alinement with the apertures and means for elevating the molds.

8. In a molding-machine, a suitable frame, a track thereon, a mold slidable on the track, lugs on the mold, arms having apertures to receive the lugs, a flexible connection wound on the shaft, means on the mold to engage the flexible connection and means for turning the shaft.

9. In a molding-machine, a suitable frame, a table, means for vibrating the table, a divided mold, means for holding the mold on the table, a hopper above the mold, a partition in the hopper corresponding to the partition in the mold, and means for permitting the hopper to move with the mold.

In testimony whereof we affix our signatures, in the presence of two witnesses, this 26th day of May, 1906.

GEORGE ELMER McARTHUR.
CLARENCE P. SPRINGER.

Witnesses:
F. W. DE GOLIA,
H. R. BENNETT.